VOICE OPERATED RELAY
Filed March 28, 1946
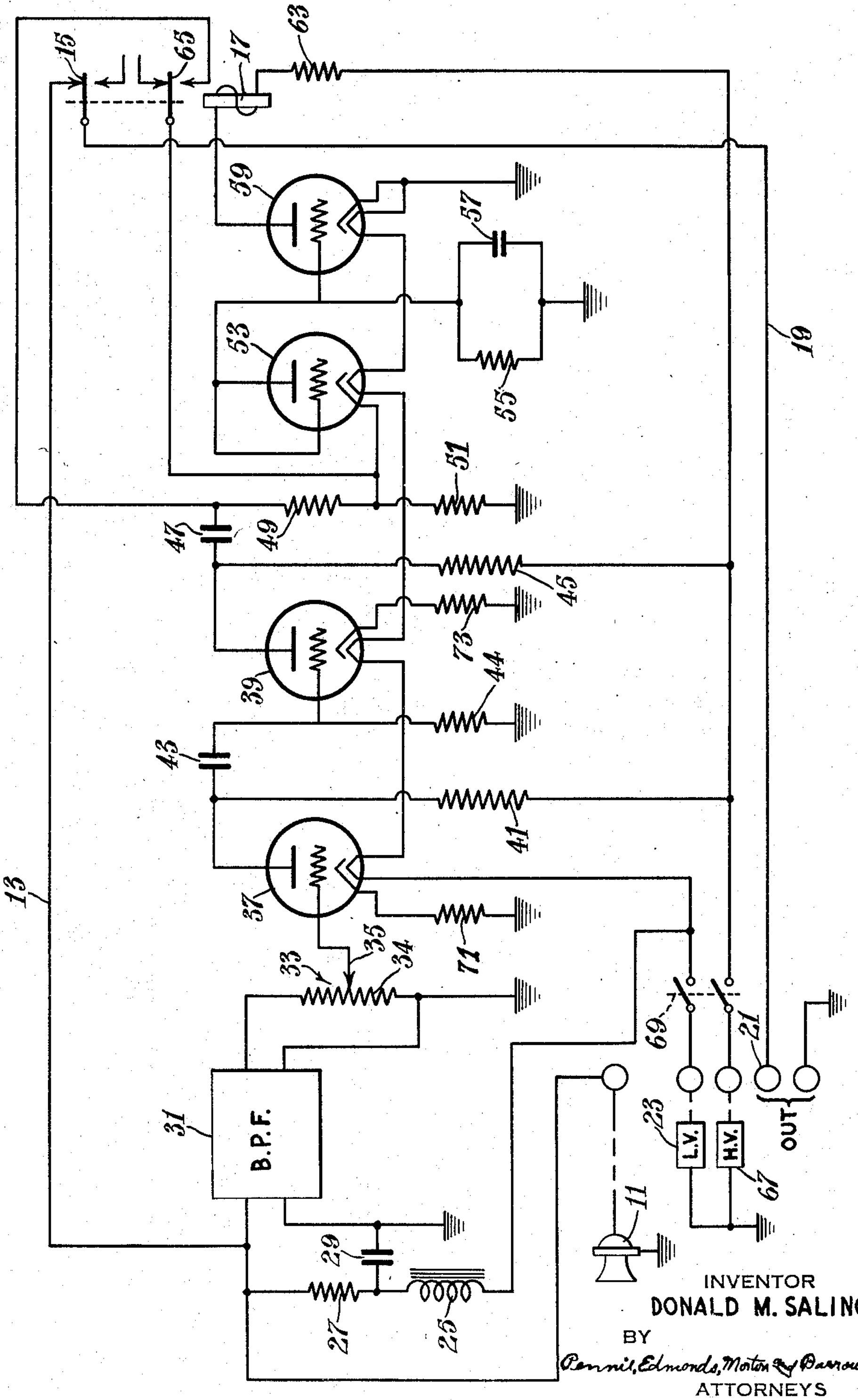
INVENTOR
DONALD M. SALING
BY
Pennie, Edmonds, Morton & Barrows
ATTORNEYS Patented Mar. 6, 1951 2,543,807

UNITED STATES PATENT OFFICE 2,543,807

VOICE OPERATED RELAY

Donald M. Saling, Poughkeepsie, N. Y., assignor to ATF Incorporated, a corporation of New Jersey Application March 28, 1946, Serial No. 657,712

7 Claims. (Cl. 179—1)

This invention relates to telephone apparatus employing a relay operated by voice energy to perform a switching function. More specifically, the invention relates to telephone apparatus designed to operate under troublesome noise conditions such as are encountered, for example, on certain types of aircraft, and to voice operated switching arrangements included therein to aid in discriminating against noise.

When telephone conversations have had to be carried on under high noise level conditions and particularly when several microphones exposed to noise might simultaneously be connected in circuit, as in intercommunicating telephone systems connecting the battle stations on combat aircraft, it has been customary heretofore in order to have intelligible communication to provide a push-button switch in association with each microphone whereby the microphone was normally deenergized and hence rendered insensitive to noise but could be energized for talking purposes by actuation of the switch. This arrangement results in a reduction of the average noise transmitted over the circuit to the receivers but it is well known that under stress, as during combat or in sudden emergencies, a speaker is likely to forget to operate the microphone switch or to fail properly to synchronize its operation with his speech, with the result that communication often has been unsatisfactory and serious misunderstandings have occurred. Also, the microphone is often held energized when talking is not taking place, thereby picking-up and transmitting unnecessary noise.

The present invention eliminates the manually operated microphone switch of prior art and instead provides for the switching of a speech transmission circuit, fed by a microphone, between an inoperative and an operative condition under the control of an improved type of voice operated relay, this relay holding the speech circuit inoperative to transmit noise to the receivers at all times when talking is not taking place. It is known that prior designs of voice operated relays have been used for various switching purposes, including the prevention of oscillation of a telephone or radio circuit, but such prior arrangements have included features which have rendered the apparatus not only expensive but weighty and bulky and thereby greatly restricted its field of application, particularly in connection with aircraft.

It is an important object of the invention to provide for use in a telephone system a simple, reliable, compact and relatively inexpensive voice operated relay to switch a speech transmission circuit, connected to a microphone, from an inoperative to an operative condition under the influence of voice-generated currents and to hold the circuit in an operative condition during the variations and minor interruptions of normal connected speech.

It is another object to provide an arrangement of a voice operated relay associated with a speech transmission circuit whereby the sensitivity of the relay, or of a circuit supplying current thereto, is automatically adjusted according to the condition of transmission or lack of transmission of speech.

Another object is to provide arrangements whereby a speech transmission circuit is switched by voice operated means from an inoperative to an operative condition and the sensitivity of the switching means is simultaneously adjusted.

A further object is to discriminate against noise in arrangements of the above character by providing a voice operated relay which is sensitive to a selected frequency band comprising high energy voice components but insensitive to other frequencies comprised within the noise spectrum.

In its general aspects the invention comprises a voice-operated relay circuit for use in association with a speech transmission circuit fed by a microphone, the relay circuit passing a restricted voice frequency band of, say, 300 to 1200 cycles. This band of frequencies includes a high proportion of the voice energy but discriminates against noise of most types, which has a wider and more uniform frequency distribution. The relay is provided with a contact connected in the speech circuit to control the continuity of this circuit in dependence upon the occurrence of speech and a contact controlling the sensitivity of the relay operating circuit. The latter control feature prevents the relay from being locked by noise in the position to which it is operated by speech. A time delay circuit may be provided to prolong the relay operating current and cause it to bridge the gaps between syllables and words of connected speech. The relay apparatus may be light in weight and assembled in compact form, enabling it to be associated without difficulty with each station of an aircraft intercommunicating telephone system.

The invention will be better understood from the following detailed description, taken in connection with the appended drawing, the single figure of which is a circuit diagram of a preferred embodiment thereof.

In the drawing, there is shown a telephone transmitter or microphone 11 connected to a speech transmission circuit, one side of which is grounded. The other side of the speech circuit may be traced from microphone 11 by way of conductor 13, back contact 15 of relay 17 and conductor 19, to output terminal 21. Any suitable device, such as a telephone receiver or loud speaker, or an amplifier serving such devices, may be permanently connected between terminal 21 and ground, or switched therebetween, to receive sound-induced current transmitted over the circuit just traced, and this circuit may represent one of a number of interconnected speech transmission circuits associated, respectively, with the several stations of an intercommunicating telephone system. Microphone 11 may be of the carbon granule type, energized by current supplied from a grounded D. C. source 23 of low voltage through choke coil 25 and resistance 27 in series, coil 25 and source 23 being bypassed by a condenser 29 having a low impedance at voice frequencies.

Across the speech circuit adjacent resistance 27 there is bridged a relay operating circuit, also having one side grounded, to which is applied the voltage developed across resistance 27 by voice currents generated in microphone 11. The first element of the relay operating circuit is a band pass filter 31 passing a restricted band of voice frequencies which, by way of illustration, only, may include the frequencies between 300 to 1200 cycles. This pass band is considerably narrower than the frequency band transmitted by the speech transmission circuit and results in a favorable ratio of relay operating signal to noise. Filter 31 preferably comprises a T section having series condensers, not shown, blocking the flow of direct current from source 23. The filter elements may be small and the assembly compact, since sharp cut-offs are not necessary.

The output of filter 31 is applied to a gain control potentiometer 33 comprising a resistance element 34 over which slider 35 operates to pick off an adjustable portion of the voltage developed across the resistance. This fractional voltage is applied to the first stage of a two stage amplifier of conventional design comprising triodes 37 and 39, resistance coupled by plate resistance 41, condenser 43 and grid resistance 44. To conserve space the electrode assemblies of triodes 37 and 39 may conveniently be enclosed in a single envelope to constitute a tube of the well-known "duplex" type.

Triode 39 is coupled by resistance 45, condenser 47, series resistance 49 and shunt resistance 51 to a rectifier constituted by triode 53 connected as a diode, the voltage applied to the rectifier being that developed across resistance 51. The output circuit of rectifier 53 comprises resistance 55 and condenser 57 connected in parallel. This R. C. circuit, according to the principles of the invention, is designed to have a time constant preferably somewhat greater than the time interval between words of connected speech, for example, of the order of half a second, so that the speech circuit will not be interrupted during such intervals by the operation of relay 17 in a manner to be described.

The voltage across resistance 55 constitutes a negative bias on the grid of triode 59, which serves as a D. C. amplifier sensitive to the output of rectifier 53. For reasons of space the electrodes of triodes 53 and 59, also, may be elements of a "duplex" tube. In the output or plate circuit of triode 59 the winding of relay 17 is connected in series with a current-limiting resistance 63. Relay 17 controls back contact 15, previously referred to, and a front contact 65. Closure of contact 15, in the released position of the relay armature, completes the ungrounded side of the speech transmission circuit from microphone 11 to output terminal 21, while closure of contact 65, in the attracted position of the relay armature, short circuits series resistance 49 and thereby applies a greater portion of the output voltage of tube 39 to resistance 51 than is applied with resistance 49 in circuit.

The heaters of triodes 37, 39 and 59 may conveniently be connected in series and supplied with current from the low voltage grounded D. C. source 23 supplying microphone 11. The plate currents of triodes 37, 39 and 59 may be supplied from a suitable grounded high voltage D. C. source, such as source 67. Triodes 37 and 39 are shown as biased by cathode resistances 71 and 73, respectively. A two-pole switch 69 may simultaneously control current from both the low voltage and high voltage sources.

In the operation of the described circuits and apparatus of the invention, with switch 69 open the relay circuit is inactive and relay 17 is in its released position, due to the absence of current in the plate circuit of tube 59. Relay back contact 15 is then closed and the speech transmission circuit is in condition to operate independently of the relay circuit. The closing of switch 69 activates the tubes of the relay circuit and the plate current of tube 59 causes the operation of relay 17, thereby breaking the speech transmission circuit at contact 15 and short circuiting resistance 49 at contact 65. The breaking of the speech transmission circuit prevents noise picked up by microphone 11 from being transmitted to the receiver or receivers connected in circuit, while the short circuiting of resistance 49 places the relay circuit in the more sensitive of its two relay-controlled operating conditions. The overall sensitivity of the relay circuit is then adjusted by means of gain control 33 to a point at which the maximum noise output of the circuit is insufficient to cause the release of relay 17, but at the same time the initial syllable of a word spoken directly into microphone 11 will cause release of the relay.

The manner in which sound-induced currents control relay 17 may be examined more in detail as follows:

The currents, due to the voice or to noise, generated by microphone 11 which have frequencies lying within the pass band of filter 31 are amplified by tubes 37 and 39 and rectified by tube 53 to cause current to flow through resistance 55 and thereby apply a negative voltage to the grid of tube 59. Since there is always a certain amount of background noise, this tube, therefore, will always operate with a negative bias. An increase of this bias, in a negative sense, of a sufficient amount, such as due to the initial syllable of a word spoken into microphone 11 will then cause a decrease in the plate current of tube 59 and with suitable adjustment of gain control 33, bring about the release of relay 17. Subsequent variations of voice level and minor interruptions, such as those between syllables and words, are, in the properly adjusted condition of the circuit, ineffective to reduce the negative bias of tube 59 to a sufficient degree to release relay 17 because of the charge built up on condenser 57, which discharges through resistance 55 and tends to maintain the negative bias on the grid of tube 59.

Release of relay 17, in addition to completing the speech circuit, breaks the short circuit across resistance 49 and introduces this resistance in the coupling circuit between tubes 39 and 53. This decrease in sensitivity of the relay circuit, when the voice is applied to microphone 11, provides an operating differential which prevents noise from locking or holding relay 17 in a released position after talking has stopped. Such locking might otherwise occur, since less input is required to hold the relay released than is required initially to effect its release. The necessary operating differential has been found to be of the order of 2 to 3 decibels, which is provided by the switching of resistance 49.

Upon the cessation of connected speech, relay 17 remains in its released position until the charge on condenser 57 leaks off through resistance 55 to a sufficient extent to permit the negative bias on the grid of tube 59 to be reduced to its normal value and the plate current to rise to the relay operating value. When this occurs, the speech transmission circuit is again interrupted and remains in an inoperative condition until a further speech impulse is applied to microphone 11.

The preferred use of a negative bias on tube 59 and the increase of this bias by a sound input to the microphone provides a safety feature in that high inputs tend to reduce the plate current of tube 59 to zero and thus avoid the overloading which might otherwise occur if a high positive voltage were applied to the tube by the operating signal.

The embodiment of the invention described herein is to be understood to be by way of illustration, only, the scope of the invention being defined by the appended claims.

I claim:

1. In a telephone system adapted to operate under high noise level conditions, a microphone, a speech transmission circuit fed thereby, a relay operating circuit connected to said speech circuit to receive the output of said microphone jointly therewith, said relay operating circuit having means providing at least two degrees of sensitivity and means including a filter for deriving from said output a restricted band of speech frequencies comprising a relatively high proportion of total speech energy and a relatively low proportion of total noise energy, and a relay actuated by said operating circuit in response to the output of said filter means and adapted jointly to control the effectiveness of said speech circuit and the sensitivity of said operating circuit, thereby to control the noise transmitted over said speech circuit and the effect of noise on said relay, respectively.

2. In an intercommunicating telephone system adapted to operate under high noise level conditions, a plurality of talking stations each including a microphone, a speech transmission circuit connected to each microphone, circuit means interconnecting said transmission circuits, a relay operating circuit connected to each microphone and fed thereby jointly with said speech circuit, and a relay connected to each of said operating circuits for actuation by the output thereof, each of said operating circuits including a filter passing a restricted band of speech frequencies discriminating against noise and a sensitivity control circuit providing at least two degrees of sensitivity in the operation of the respective relay, and a delay circuit in each of said operating circuits adapted to prolong an output from the circuit after the input causative thereof has ceased, each of said relays having contacts respectively controlling the continuity of the respective speech circuit and the condition of the respective sensitivity control circuit, said contacts being arranged to reduce the sensitivity of the operating circuit upon actuation of the relay by speech.

3. In a voice operated relay circuit for switching a speech transmission circuit, a band pass filter connected to receive speech signals supplied to said speech transmission circuit and designed to pass a band of frequencies predominant in voices and substantially less than the pass band of said speed transmission circuit, rectifier means connected to receive and to rectify the output of said filter and an output amplifier tube having a control grid direct current connected to the output of said rectifier means, said rectifier means being connected to supply a negative voltage to said control grid in proportion to said rectified output, a delay circuit connected in circuit between said rectifier and amplifier to delay a change in said voltage relative to a causative change of said output and sensitivity control means for altering the amplitude of said voltage, and a direct current relay connected in the plate circuit of said tube normally operated by the plate current thereof and released upon application of said negative voltage to said grid in excess of a selected value, said relay controlling said sensitivity control means to reduce the sensitivity of the relay circuit upon operation by a voice, said relay having a contact operatively connected in said speech circuit to control the transmission therethrough.

4. Apparatus as claimed in claim 3 wherein said delay circuit has a time constant of the order of half a second.

5. In a voice operated relay circuit connected to receive an input from a microphone exposed to noise and feeding a speech transmission circuit, a filter passing a restricted band of audible frequencies discriminating against noise, amplifier-rectifier means connected to receive and to rectify the output of said filter including an output thermionic tube functioning as a direct current amplifier, circuit means applying a negative voltage to a control grid of said tube in proportion to said rectified output, an input sensitivity control for said tube and a delay circuit delaying changes in said negative voltage relative to causative changes of said filter output and having a time constant greater than the maximum intervals between words of normal connected speech, and a relay having the winding thereof connected in the plate circuit of said tube for operation in accordance with changes of plate current thereof comprising contacts respectively controlling the continuity of said speech circuit and the condition of said sensitivity control, whereby said relay may be adjusted in the absence of speech to interrupt said speech circuit and maintain the sensitivity of said control at a maximum and upon actuation due to a change of said plate current responsive to speech to close said speech circuit and maintain the sensitivity of said control at a minimum, thereby to discriminate against the transmission of noise over said speech circuit and reduce the effect of noise on said relay.

6. In a telephone system adapted to operate under high noise level conditions, a voice-operated relay circuit for controlling a telephone transmission circuit which comprises an amplifier-rectifier circuit fed from said telephone transmission circuit to obtain a rectified current which varies with the transmissions, a relay controlled by the output of said rectifier and operatively connected to control the transmission through said transmission circuit, a sensitivity control in said amplifier-rectifier circuit having means for increasing and reducing the sensitivity of said circuit, and connections from said relay to said means to reduce the sensitivity of the circuit upon actuation of said relay by telephone transmissions.

7. In a telephone system adapted to operate under high noise level conditions, a voice-operated relay circuit for controlling a telephone transmission circuit which comprises a filter connected to receive telephone transmissions over said circuit and passing a restricted band of audible frequencies predominant in voices and substantially less than the pass band of said transmission circuit, a rectifier fed from said filter, a relay controlled by the output of said rectifier and operatively connected to control the transmission through said transmission circuit, a sensitivity control in said relay circuit having means for increasing and reducing the sensitivity of said circuit, and connections from said relay to said means to reduce the sensitivity of the circuit upon actuation of said relay by telephone transmissions.

DONALD M. SALING.

REFERENCES CITED

The following references are of record in the file of this patent:

UNITED STATES PATENTS

| Number | Name | Date |
|---|---|---|
| 2,009,229 | Hammond | July 23, 1935 |
| 2,214,804 | Augustadt | Sept. 17, 1940 |
| 2,237,899 | Bjornson | Apr. 8, 1941 |
| 2,341,539 | Giannini | Feb. 15, 1944 |
| 2,424,069 | Tschumi | July 15, 1947 |